(12) United States Patent
Lebreux

(10) Patent No.: US 11,721,972 B2
(45) Date of Patent: *Aug. 8, 2023

(54) ELECTRIC SYSTEM AND METHOD FOR ENERGIZING THE ELECTRIC SYSTEM

(71) Applicant: BOMBARDIER RECREATIONAL PRODUCTS INC., Valcourt (CA)

(72) Inventor: Normand Lebreux, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 173 days.

This patent is subject to a terminal disclaimer.

(21) Appl. No.: 17/233,628

(22) Filed: Apr. 19, 2021

(65) Prior Publication Data

US 2021/0242709 A1 Aug. 5, 2021

Related U.S. Application Data

(62) Division of application No. 16/464,676, filed as application No. PCT/IB2017/057544 on Nov. 30, 2017, now Pat. No. 10,992,164.

(Continued)

(51) Int. Cl.
*H02J 7/34* (2006.01)
*B60L 58/18* (2019.01)
(Continued)

(52) U.S. Cl.
CPC ............... *H02H 9/02* (2013.01); *B60L 50/64* (2019.02); *B60L 50/66* (2019.02); *B60L 58/18* (2019.02);
(Continued)

(58) Field of Classification Search
CPC ........................................................ H02H 9/02
(Continued)

(56) References Cited

U.S. PATENT DOCUMENTS 5,844,325 A 12/1998 Waugh et al.
8,174,237 B2 5/2012 Kosugi et al.
(Continued)

FOREIGN PATENT DOCUMENTS

CN 202103399 U 1/2012
WO WO2016/120857 A1 8/2016

OTHER PUBLICATIONS

International Search Report of PCT/IB2017/057544; dated May 7, 2018; Shane Thomas.
(Continued)

*Primary Examiner* — Edward Tso
*Assistant Examiner* — Ahmed H Omar
(74) *Attorney, Agent, or Firm* — BCF LLP

(57) ABSTRACT

An electric system is disclosed. The electric system comprises first and second battery subassemblies, an interrupter, and a system controller. The interrupter connects the first battery subassembly in series to the second battery subassembly via a switched current-limiting path in parallel with a switched non-current-limiting path. The first battery subassembly causes closing of the switched current-limiting path when an energizing trigger is applied to the electric system. The system controller causes closing of the switched non-current-limiting path when energized by the first and second battery subassemblies. The electric system may be integrated in an electric vehicle. A method for energizing an electric system is also disclosed.

17 Claims, 7 Drawing Sheets

Related U.S. Application Data

(60) Provisional application No. 62/428,281, filed on Nov. 30, 2016.

(51) Int. Cl.

| | |
|---|---|
| *H02H 9/02* | (2006.01) |
| *B60L 50/64* | (2019.01) |
| *B60L 50/60* | (2019.01) |
| *H01M 10/42* | (2006.01) |
| *H02H 3/08* | (2006.01) |
| *H02J 7/00* | (2006.01) |
| *H02J 1/08* | (2006.01) |

(52) U.S. Cl.
CPC ............ *H01M 10/425* (2013.01); *H02H 3/08* (2013.01); *H02J 1/08* (2013.01); *H02J 7/00* (2013.01); *H02J 7/0019* (2013.01); *H02J 7/0031* (2013.01); *H02J 7/00304* (2020.01); *H02J 7/00309* (2020.01); *H02J 7/342* (2020.01); *H01M 10/4257* (2013.01); *H01M 2220/20* (2013.01); *H02J 2207/10* (2020.01); *H02J 2310/48* (2020.01)

(58) Field of Classification Search
USPC ........................................................ 320/134
See application file for complete search history.

(56) References Cited

U.S. PATENT DOCUMENTS

| | | | |
|---|---|---|---|
| 8,766,602 | B1 | 7/2014 | Kimes |
| 9,496,749 | B2 | 11/2016 | Noda et al. |
| 10,658,853 | B2 | 5/2020 | Nishikawa et al. |
| 2004/0026140 | A1 | 2/2004 | Suzuki et al. |
| 2007/0159007 | A1 | 7/2007 | King et al. |
| 2008/0257324 | A1 | 10/2008 | French |
| 2009/0160252 | A1 | 6/2009 | Kojima et al. |
| 2010/0127663 | A1 | 5/2010 | Furukawa et al. |
| 2010/0277845 | A1 | 11/2010 | Park et al. |
| 2010/0296204 | A1 | 11/2010 | Ichikawa et al. |
| 2011/0082611 | A1 | 4/2011 | Shiba et al. |
| 2011/0298424 | A1 | 12/2011 | Yamauchi et al. |
| 2012/0013182 | A1 | 1/2012 | Minegishi |
| 2013/0063091 | A1 | 3/2013 | Nishi et al. |
| 2013/0106320 | A1 | 5/2013 | Yugo et al. |
| 2013/0264995 | A1 | 10/2013 | Lee |
| 2014/0132226 | A1 | 5/2014 | Sakamoto et al. |
| 2014/0252847 | A1 | 9/2014 | Yang et al. |
| 2014/0312844 | A1 | 10/2014 | Mercier et al. |
| 2014/0343776 | A1* | 11/2014 | Ang .................. H02J 7/02 701/22 |
| 2015/0037656 | A1* | 2/2015 | Noda ............... H01M 10/4264 429/149 |
| 2017/0133722 | A1 | 5/2017 | Kim et al. |
| 2017/0166075 | A1 | 6/2017 | Hong et al. |
| 2018/0072179 | A1 | 3/2018 | Burkman et al. |

OTHER PUBLICATIONS

SAE Surface Vehicle Standard J1673 Mar. 2012 "High Voltage Automotive Wiring Assembly Design" 1996-07, pp. 1-6.

United Nations "Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions"; Addendum 99: Regulation No. 100; Aug. 12, 2013.

United Nations Concerning the Adoption of Uniform Technical Prescriptions for Wheeled Vehicles, Equipment and Parts which can be Fitted and/or be Used on Wheeled Vehicles and the Conditions for Reciprocal Recognition of Approvals Granted on the Basis of these Prescriptions Addendum 135- Regulation No. 136; Feb. 5, 2016.

Official Journal of the European Union, Directive 2006/95/EC of the European Parliament and of the Council of Dec. 12, 2006 on the harmonisation of the laws of Member States relating to electrical equipment designed for use within certain voltage limits; Dec. 27, 2006; L374/11.

International Preliminary Report on Patentability of PCT/IB2017/057544; dated Jun. 18, 2019; Richard Isla.

Supplementary European Search Report issued un corresponding European application No. 1787650.1 dated Mar. 23, 2020.

* cited by examiner

ELECTRIC SYSTEM AND METHOD FOR ENERGIZING THE ELECTRIC SYSTEM

CROSS-REFERENCE

The present application is a division of U.S. patent application Ser. No. 16/464,676, filed on May 28, 2019, which is a National Phase Entry of International Patent Application No. PCT/M2017/057544, filed on Nov. 30, 2017, which claims priority to U.S. Provisional Patent Application No. 62/428,281, filed on Nov. 30, 2016, the entirety of all of which is incorporated herein by reference.

FIELD OF TECHNOLOGY

The present technology relates to rechargeable battery systems for use in vehicles.

BACKGROUND

Electric vehicles, including hybrid vehicles, use secondary batteries such as for example lithium-ion batteries to power electric motors for propulsion. These vehicles also carry 12V lead-acid auxiliary batteries to provide standby power, system wake-up, software updates and start of an internal combustion engine (ICE) when present.

FIG. 1 is a simplified circuit diagram of a prior electric vehicle. A circuit 100 comprises a battery pack 102 that includes four (4) module groups 104, 106, 108 and 110 connected in series. An example of such a battery pack and module groups is described in International Patent Publication Number WO 2016/120857 A1 to Lebreux et al, published on Aug. 4, 2016, the disclosure of which is incorporated by reference herein in its entirety. In this example, each module group 104, 106, 108 and 110 comprises a plurality of battery cells (not shown) that each can provide electric power at 24 volts. Overall, the battery pack 102 is capable of providing electric power at 96 volts.

According to the SAE Surface Vehicle Standard J1673 MAR2012, vehicle systems that contain a circuit operating above 50 volts (DC) are considered "high voltage" and surpass a higher limit of a low voltage range. Similar technical standards and/or regulations exist for other regions, such as the European Union's Directive 2006/95/EC which pertains to circuits over 75 volts (DC) and the United Nations' UNECE R100 for vehicles of category M&N or UNECE R136 for vehicles of category L which pertains to circuits over 60 volts (DC). To this end, a service switch 112, located between the module groups 106 and 108, is normally closed to ensure continuity between the module groups 104, 106, 108 and 110. When maintenance needs to be performed on the vehicle, the service switch 112 may be opened manually by maintenance personnel. By opening the service switch 112, no point of the circuit 100 can ever be at a voltage exceeding that of two (2) module groups, for example 48V on FIG. 1, this voltage being defined by the combination of the module groups 104 and 106 or by the combination of the module groups 108 and 110.

When energized by the battery pack 102, a DC-DC converter 114 converts the 96V power down to 12V for charging a 12V lead-acid battery 116. In turn, the lead-acid battery 116 powers a vehicle control module (VCM) 118. When the vehicle is started by the user, for example using a start key (not shown) to close a starting switch 120, the VCM 118 energizes a relay coil 122. Activation of the relay coil 122 causes the closing of power switches 124 and 126 to cause energizing of a motor control module (MCM) 128 by the battery pack 102. The MCM 128 converts the 96V electric power from the battery pack into three-phase AC current for powering an electric motor 130. Fuses 132 and 134 are provided to protect the circuit 100 in case of fault. Variants of the circuit 100 may differ but generally operate in similar manners.

While lead-acid batteries are relatively inexpensive, they are heavy, have poor energy density, and occupy considerable volume within the vehicles. Considering these factors, integration of lead-acid batteries considerable cost to vehicles as a whole.

Because several key components of electric vehicles need 12V supply for proper operation, including for system start-up, lead-acid batteries are still present in today's electric vehicles. Some of the reasons for the continued use of regular 12V lead-acid batteries include the important development effort and cost that would be necessitated for validating many vehicle functionalities that currently rely on current 12V lead-acid batteries if used with 12V lithium-ion batteries. Some vehicle manufacturers contend that the lower cost of ownership and weight reduction that could be obtained by the substitution of lead-acid batteries with lithium-ion batteries would not compensate such cost and effort.

Lead-acid batteries lose their charge over time; this is particularly problematic in the case of vehicles used for recreational purposes because they may be used quite infrequently. Over discharge of auxiliary lead-acid batteries is a frequent cause of failure of current electric vehicles. One manner of preserving the charge of the lead-acid battery 116 requires moving the starting switch 120 to another position (not shown) in the circuit 100 so that a continuous connection is maintained between the battery pack 102 and the DC-DC converter 114. With such configuration, the DC-DC converter 114 maintains the lead-acid battery 116 charged as long as the battery pack 102 holds a charge. However, when the vehicle remains unused for an extended period of time, a slow discharge of the lead-acid battery 116 may lead to a complete discharge of the battery pack 102. This could be the case for example when a recreational vehicle adapted for use in the summer is not used for the whole winter. Minimizing current leakage at the system level is particularly important in the context of recreational vehicles.

[10] Therefore, there is a desire for battery systems that compensate for problems related to the use of lead-acid batteries in electric vehicles.

SUMMARY

It is an object of the present technology to ameliorate at least some of the inconveniences present in the prior art. Systems and method disclosed herein are applicable, in particular but not exclusively, for use in rechargeable electric vehicles such as motorcycles, all-terrain-vehicles, snowmobiles, personal watercraft and the like.

The present technology provides an electric system useful for powering an electric vehicle. The electric system may include modern rechargeable battery assembly while not requiring the use of a traditional auxiliary lead-acid battery. The battery assembly includes two battery subassemblies that can provide high-voltage power to an electric motor when connected in series.

The two battery subassemblies are separable when the electric system is not in use and not connected to a charger. An interrupter connects a first battery subassembly to a second battery subassembly. The interrupter closes in two (2) phases when powering or charging the electric system.

Initially, upon start of a precharge phase, the interrupter places a current-limiting path between the two battery subassemblies in order to form a current-limited battery source. Thereafter, following a completion of the precharge phase, the interrupter places a non-current-limiting path between the two battery subassemblies in order to form a non-current-limited battery source. In an aspect, the first battery subassembly initiates the establishment of the current-limiting path between the two battery subassemblies to thereby allow powering of a system controller. Thereafter, the system controller initiates the establishment of the non-current-limiting path between the two battery subassemblies.

According to a first aspect of the present technology, there is provided an electric system comprising a first battery subassembly; a second battery subassembly; an interrupter adapted for connecting the first and second battery subassemblies in series, the interrupter comprising a switched current-limiting path in parallel with a switched non-current-limiting path; and a system controller electrically connected to the first battery subassembly and to the second battery subassembly; and the first battery subassembly being adapted for causing closing of the switched current-limiting path when an energizing trigger is applied to the electric system; and the system controller being adapted for causing closing of the switched non-current-limiting path when energized by the first and second battery subassemblies.

In some implementations of the present technology, the system further comprises a first contactor of the switched current-limiting path and a first coil, the first battery subassembly being adapted for energizing the first coil for closing the first contactor and the switched current-limiting path; and a second contactor of the switched non-current-limiting path and a second coil, the system controller being adapted for energizing the second coil for closing the second contactor and the switched non-current-limiting path.

In some implementations of the present technology, the interrupter further comprises a service switch.

In some implementations of the present technology, the current-limiting path comprises a resistor adapted for limiting a current flowing between the first and second battery subassemblies and having a power rating adapted for dissipating an energy caused by the current flowing through the resistor.

In some implementations of the present technology, the first battery subassembly comprises a first battery module connected in series to a second battery module; and the second battery subassembly comprises a third battery module connected in series to a fourth battery module.

In some implementations of the present technology, the first battery module comprises a first battery management system (BMS) operatively connected to an activation switch, the energizing trigger being applied to the activation switch.

In some implementations of the present technology, the second battery module comprises a second BMS; the third battery module comprises a third BMS; and the fourth battery module comprises a fourth BMS.

In some implementations of the present technology, the first BMS is adapted for cascading the energizing trigger to the second BMS; the second BMS is adapted for cascading the energizing trigger to the third BMS; the third BMS is adapted for cascading the energizing trigger to the fourth BMS; and at least one of the first, second, third and fourth BMSs is communicatively coupled to the system controller and is adapted for informing the system controller of the energizing trigger.

In some implementations of the present technology, the at least one of the first, second, third and fourth BMSs is adapted for detecting an abnormal condition and for informing the system controller of the abnormal condition.

In some implementations of the present technology, the at least one of the first, second, third and fourth BMSs is adapted for recording a log of the abnormal condition.

In some implementations of the present technology, the system controller is adapted for detecting an abnormal condition and for informing the at least one of the first, second, third and fourth BMSs of In some implementations of the present technology, the system controller is adapted for recording a log of the abnormal condition.

In some implementations of the present technology, the abnormal condition is selected from an abnormal voltage of one or more of the first, second, third and fourth battery modules, an abnormal temperature of one or more of the first, second, third and fourth battery modules, an abnormal temperature of a motor powered by the electric system, an excessive level of current flowing through one or more of the first, second, third and fourth battery modules, detection of a user activation of an emergency stop switch, and detection of a user activation of a hazard switch, In some implementations of the present technology, the electric system is adapted for opening the switched non-current-limiting path to shutdown the electric system when the abnormal condition is a severe abnormal condition.

In some implementations of the present technology, a maximum operating voltage of each of the first and second battery subassemblies individually is less than a high voltage limit; and when the switched non-current-limiting path is closed, a combined voltage of the first and second battery subassemblies is greater than the high voltage limit.

In some implementations of the present technology, the high voltage limit is 60 Volts.

In some implementations of the present technology, a combined voltage of the first and second battery subassemblies is 96 volts.

In some implementations of the present technology, the first and second battery subassemblies provide a nominal system voltage when connected in series.

In some implementations of the present technology, the system further comprises a voltage converter adapted for converting the nominal system voltage to a control voltage, the nominal system voltage being greater than the control voltage; the system controller being adapted for being energized with the control voltage.

In some implementations of the present technology, the system further comprises a motor; and a motor controller adapted for being energized with the control voltage and for delivering electric power from the first and second battery subassemblies to the motor at the nominal system voltage.

In some implementations of the present technology, the motor is an AC motor; the motor controller is an AC motor controller further comprising an inverter adapted for converting the nominal system voltage into an AC voltage and for delivering electric power from the first and second battery subassemblies to the AC motor at the AC voltage.

In some implementations of the present technology, the AC motor is a multi-phase motor; and the inverter is adapted for delivering electric power from the first and second battery subassemblies to the multi-phase motor at a multi-phase AC voltage.

In some implementations of the present technology, the motor is adapted for delivering electric power to the motor controller when a braking force is applied to the motor; and the motor controller is adapted for delivering electric power to the first and second battery subassemblies when the braking force is applied to the motor.

In some implementations of the present technology, the system controller is adapted for closing the switched non-current-limiting path when a condition is met, the condition being selected from at least one of a minimum time delay having been spent after the closing of the switched current-limiting path, a voltage sensed on a load-side of the electric system having reached a minimum voltage threshold, and a current flowing through the first and second battery subassemblies having fallen below a maximum current threshold.

In some implementations of the present technology, the system further comprises a start button operatively connected to the first battery subassembly, the start button being adapted for providing the energizing trigger for starting the electric system.

In some implementations of the present technology, the system further comprises a charger switch operatively connected to the first battery subassembly, the charger switch being adapted for providing the energizing trigger and for delivering electric power for charging the first and second battery subassemblies.

In some implementations of the present technology, the system controller is adapted for signaling to the first battery subassembly when the switched non-current-limiting path is closed, and the first battery subassembly is adapted for opening the switched current-limiting path in response to receiving the signaling.

In some implementations of the present technology, the system controller is adapted for opening the switched non-current-limiting path to shutdown the electric system.

According to a second aspect of the present technology, there is provided a vehicle comprising an electric system comprising a first battery subassembly; a second battery subassembly; an interrupter adapted for connecting the first and second battery subassemblies in series, the interrupter comprising a switched current-limiting path in parallel with a switched non-current-limiting path; and a system controller electrically connected to the first battery subassembly and to the second battery subassembly; and the first battery subassembly being adapted for causing closing of the switched current-limiting path when an energizing trigger is applied to the electric system; and the system controller being adapted for causing closing of the switched non-current-limiting path when energized by the first and second battery subassemblies, the vehicle being an electric or hybrid vehicle.

According to a third aspect of the present technology, there is provided a method for energizing an electric system. The method comprises applying an energizing trigger to a first battery subassembly; in response to the energizing trigger, connecting the first battery subassembly in series to a second battery subassembly via a current-limiting path; delivering electric power from the first and second battery subassemblies connected in series via the current-limiting path to energize a system controller; and once the system controller is energized, connecting the first battery subassembly in series to the second battery subassembly via a non-current-limiting path.

In some implementations of the present technology, the first and second battery subassemblies provide a nominal system voltage when connected in series.

In some implementations of the present technology, the method further comprises converting the nominal system voltage to a control voltage, the nominal system voltage being greater than the control voltage; and energizing the system controller with the control voltage.

In some implementations of the present technology, the electric system comprises a motor and a motor controller, the method further comprising energizing the motor controller with the control voltage; and delivering electric power from the motor controller to the motor at the nominal system voltage.

In some implementations of the present technology, the motor is an AC motor and a motor controller, the method further comprising energizing the motor controller with the control voltage; converting the nominal system voltage into an AC voltage; and delivering electric power from the motor controller to the AC motor at the AC voltage.

In some implementations of the present technology, the AC motor is a multi-phase motor; and the electric power is delivered to the multi-phase motor at a multi-phase AC voltage.

In some implementations of the present technology, the first battery subassembly comprises a first battery module connected in series to a second battery module; and the second battery subassembly comprises a third battery module connected in series to a fourth battery module.

In some implementations of the present technology, the energizing trigger is applied to the first battery module, the method further comprising successively cascading the energizing trigger from the first battery module to the second, third and fourth battery modules.

In some implementations of the present technology, connecting the first battery subassembly to the second battery subassembly is controlled by the first battery module.

In some implementations of the present technology, the current-limiting path is in parallel with the non-current-limiting path, the method further comprising closing a service switch in series with the current-limiting and non-current-limiting paths.

In some implementations of the present technology, the energizing trigger is a start command; the first battery subassembly or the second battery subassembly forwards an indication of the start command to the system controller; and the system controller controls an operation of the electric system in response to the indication of the start command.

In some implementations of the present technology, the start command is a transient command.

In some implementations of the present technology, the energizing trigger is a charging command; the first battery subassembly or the second battery subassembly forwards an indication of the charging command to the system controller; and the system controller controls charging of the first and second battery subassemblies in response to the indication of the charging command.

In some implementations of the present technology, the charging command is a continuous command.

In some implementations of the present technology, connecting the first battery subassembly in series to the second battery subassembly via the non-current-limiting path is delayed until a condition is met, the condition being selected from at least one of a minimum time delay having been spent after connecting the first and second battery subassemblies via the current-limiting path, a voltage provided by the first and second battery subassemblies having reached a minimum voltage threshold, and a current flowing through the first and second battery subassemblies having fallen below a maximum current threshold.

In some implementations of the present technology, the method further comprises disconnecting the current-limiting path between the first and second battery subassemblies after connecting the first and second battery subassemblies via the non-current-limiting path.

In some implementations of the present technology, the method further comprises opening the non-current-limiting path to shutdown the electric system.

According to a fourth aspect of the present technology, there is provided an electric system, comprising a battery assembly; a current limiter; and a first battery management system (BMS) adapted for causing the battery assembly to energize the electric system using the current limiter upon a start of a precharge phase and for causing the battery assembly to energize the electric system without the current limiter following a completion of the precharge phase.

According to a fifth aspect of the present technology, there is provided a method of energizing an electric system. The method comprises applying an energizing trigger to the electric system; in response to the energizing trigger, energizing the electric system from a current-limited battery source during a precharge phase; and following completion of the precharge phase, energizing the electric system from a non-current-limited battery source.

According to a sixth aspect of the present technology, there is provided an electric system comprising a first battery module comprising at least one first battery cell, a first battery management system (BMS) and a first BMS switching power supply, the at least one first battery cell and the first BMS switching power supply being disconnected when the first BMS is in an inactive state, the at least one first battery cell and the first BMS switching power supply being connected when the first BMS is in a powered state; a second battery module electrically connectable to the first battery module, the second battery module comprising at least one second battery cell, a second BMS and a second BMS switching power supply, the at least one second battery cell and the second BMS switching power supply being disconnected when the second battery module is in an inactive state, the at least one second battery cell and the second BMS switching power supply being connected when the second BMS is in a powered state; and a user-controlled switch adapted for causing a connection of the at least one first battery cell to the first BMS switching power supply for energizing the first BMS and for changing the first BMS from the inactive state to the powered state; the first BMS being adapted for causing a connection of the at least one second battery cell to the second BMS switching power supply for energizing the second BMS and for changing the second BMS from the inactive state to the powered state when the first BMS is in the powered state; the first BMS being further adapted for closing a current-limiting path placed in series between the first and second battery modules to start a precharge phase of the electric system once a communication between the first BMS and the second BMS is established.

In some implementations of the present technology, the first BMS is further adapted for performing initial verifications before closing the current-limiting path.

In some implementations of the present technology, the initial verifications comprise a confirmation of the communication between the first BMS and the second BMS.

Additional and/or alternative features, aspects and advantages of implementations of the present technology will become apparent from the following description and the accompanying drawings.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology describes an electric system and a method for energizing an electric system. The electric system and the method may be integrated in a rechargeable electric vehicle having an electric motor. The electric system and the method may also be integrated in a rechargeable hybrid vehicle that includes an electric motor and an internal combustion engine.

Figure 1:
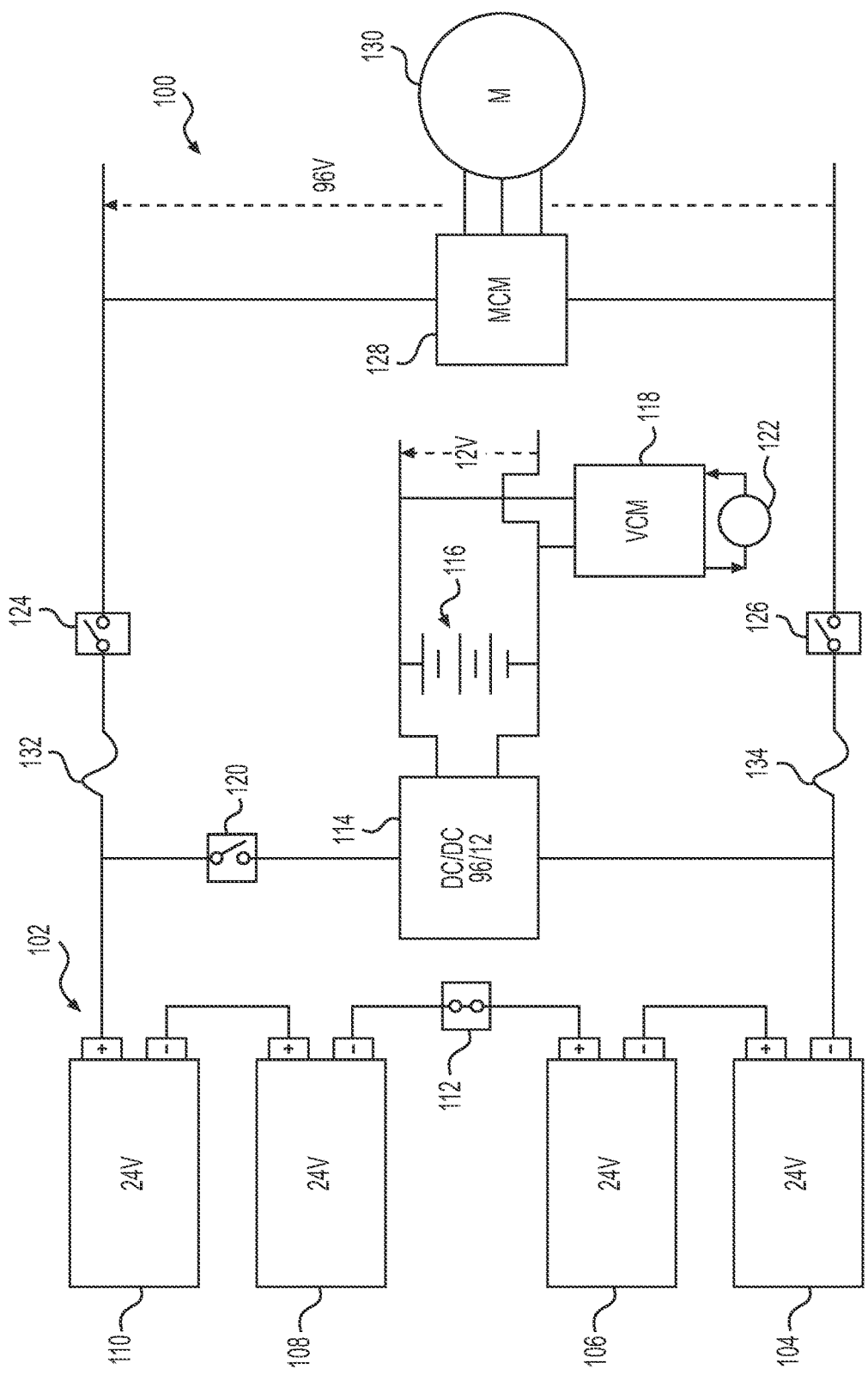
FIG. 1 is a simplified circuit diagram of a prior electric vehicle.
Figure 2:
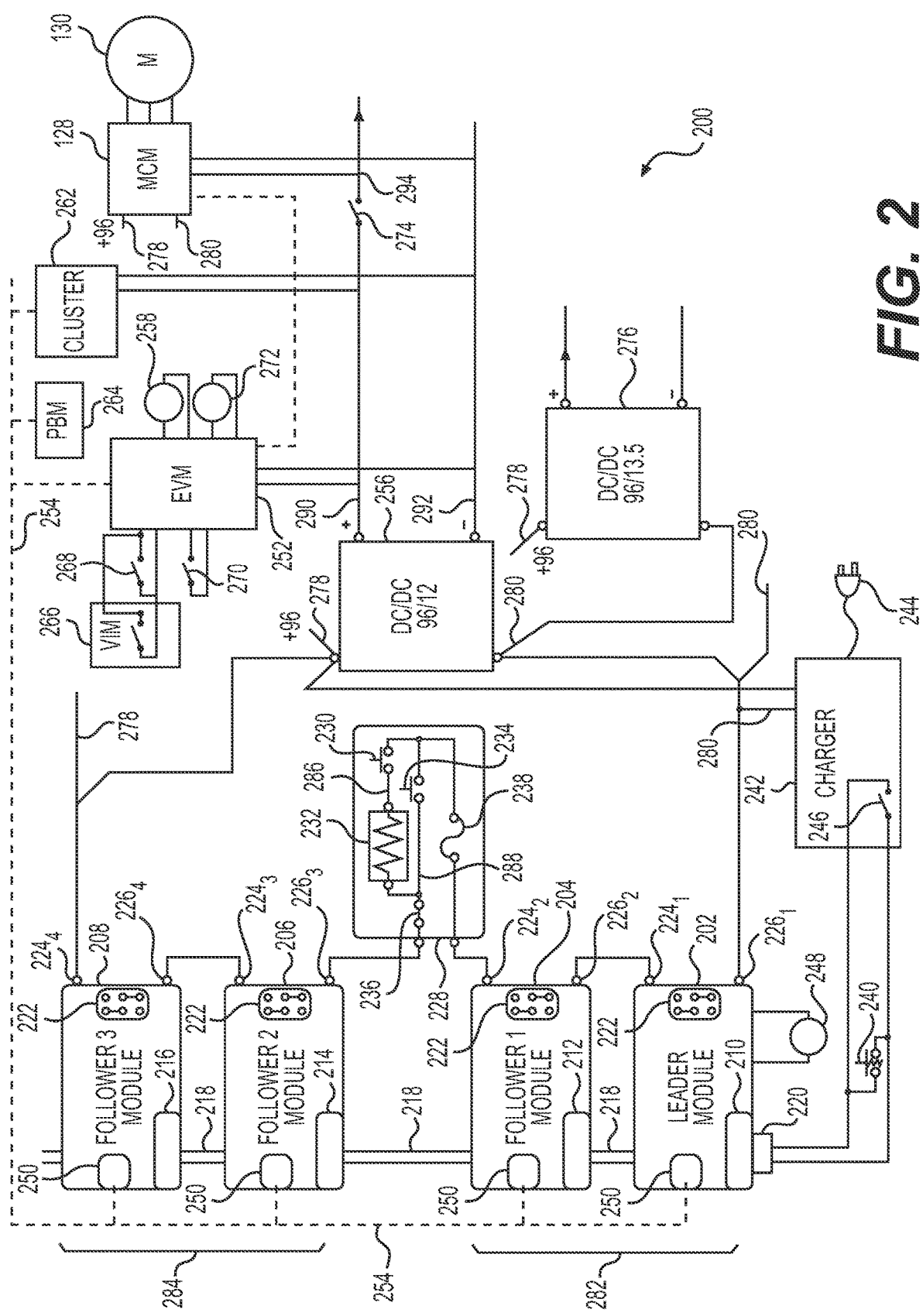
FIG. 2 is a block diagram of an electric system including battery modules according to an implementation.

Referring now to the drawings, FIG. 2 is a block diagram of an electric system 200 including battery modules 202, 204, 206 and 208 according to an implementation. The electric system 200 comprises a battery assembly that includes two (2) battery subassemblies 282 and 284. One battery subassembly 282 further comprises the battery module 202 connected in series to the battery module 204. The battery module 202 is a "leader" module and the battery module 204 is a "follower" module. Another battery subassembly 284 further comprises the battery module 206 connected in series to the battery module 208, the battery modules 206, 208 being further follower modules. The battery module 202 is the leader module in that it is the first of these four (4) battery modules 202, 204, 206, 208 on which an energizing trigger is applied upon start of the electric system 200 or upon charging of the electric system 200, to initiate a precharge phase of the battery assembly. Although four (4) battery modules 202, 204, 206, 208 are represented on FIG. 2, implementations of the electric system 200 comprising as few as two (2) battery modules are contemplated. Other contemplated implementations may include many more battery modules and there is no a priori limitation to the number of battery modules that may be part of the electric system 200.

Each battery module 202, 204, 206, 208 includes a battery controller, or battery management system (BMS) 210, 212, 214 and 216 respectively. The various BMSs 210, 212, 214 and 216 may be identical or may be distinct depending on the respective features of the battery modules 202, 204, 206, 208. In an implementation, the BMSs 210, 212, 214 and 216 may comprise a processor (not shown) having executable code for controlling the features of the battery modules 202, 204, 206, 208. It is contemplated that not every battery module 202, 204, 206, 208 be provided with its own BMS, i.e. that the functions of the BMSs 210, 212, 214 and 216 could be combined into three (3) or fewer BMSs housed within three (3) or fewer of the battery modules 202, 204, 206, 208, or indeed outside the battery modules 202, 204, 206, 208. It is also contemplated that the functions of the BMSs 210, 212, 214 and 216 be divided into more than four (4) BMSs located within or outside the battery modules 202, 204, 206, 208.

Each battery module 202, 204, 206, 208 comprises a number of battery cells 222 connected in a series and/or a parallel arrangement for providing a rated voltage, for example 24 volts, between their positive terminals 224 and their negative terminals 226. The positive terminal $224_1$ of the first battery module 202 is connected to the negative terminal $226_2$ of the second battery module 204 so that a maximum operating voltage of the first battery subassembly 282 between the negative terminal $226_1$ of the first battery module 202 and the positive terminal $224_2$ of the second battery module 204 is of 48 volts. Likewise, the positive terminal $224_3$ of the third battery module 206 is connected to the negative terminal $226_4$ of the fourth battery module 208 so that a maximum operating voltage of the second battery subassembly 284 between the negative terminal $226_3$ of the second battery module 206 and the positive terminal $224_4$ of the fourth battery module 208 is of 48 volts. When connected in series in the manner described hereinbelow, all four (4) battery modules 202, 204, 206 and 208 provide a nominal system voltage of 96 volts on a load side of the electric system 200, between DC leads 278 and 280. Implementations in which another nominal system voltage is provided by connecting different battery modules, or by connecting a different numbers of battery modules, are also contemplated. In various implementations, the nominal system voltage obtained when connecting the two battery subassemblies 282, 284 in series exceeds a standard high voltage limit, for example 60 volts, while the maximum operating voltage of each battery subassembly 282, 284 is less than this high voltage limit when isolated from one another.

The first and second battery subassemblies 282, 284 are connected to an interrupter 228. The interrupter 228 includes a switched current-limiting path 286 including a contactor 230 and a resistor 232. The interrupter 228 also includes a switched non-current-limiting path 288 including a contactor 234. The switched current-limiting path 286 is connected in parallel to the switched non-current-limiting path 288, both of these paths 286, 288 being connected in series to a normally closed service switch 236 and to a system fuse 238. The service switch 236 may be placed in an open position for servicing of the electric system 200, so that no voltage exceeding the high voltage limit is present in the electric system 200. The system fuse 238 protects the electric system 200 against current overloads.

Other techniques may be contemplated for implementing the switched current-limiting and non-current limiting paths 286, 288 of the interrupter 228. In non-limiting examples, the resistor 232 may be substituted with an inductance (not shown) alone or in combination with a power transistor (not shown) and a solid-state relay (not shown), a power transistor (not shown) may be gradually turned on using pulse width modulation while taking advantage of an intrinsic inductance of the electric system 200.

In an implementation comprising a large number of battery modules, these battery modules may be grouped into several battery subassemblies, each battery subassembly including one or more battery modules, an additional interrupter such as the interrupter 228 being inserted between each pair of battery subassemblies.

The switched current-limiting path 286 forms a current limiter for the battery assembly. When the contactor 230 is closed, upon start of a precharge phase, the battery subassemblies 282, 284 and the switched current-limiting path 286 form a current-limited battery source. When the contactor 234, the battery subassemblies 282, 284 and the switched non-current-limiting path 288 form a non-current-limited battery source. Of course, the contactor 234, the service switch 236, the system fuse 238 and connections therebetween may all offer a low, yet measurable resistance. Likewise, the battery modules 202, 204, 206, 208 may each have their own output impedance and may thus not be able to provide the system voltage at an infinite current level. In the context of the present disclosure, the expression "non-current-limiting path" and "non-current-limited battery source" will be understood as relative terms in view of the expressions "current-limiting path" and "current-limited battery source".

The various BMSs 210, 212, 214, 216 are communicatively coupled via a connection 218. The connection 218 may extend serially between the successive battery modules 202 to 208 or may alternatively provide a star connection from the leader module to the follower modules. The BMS 210 of the first battery module 202 uses the connection 218 to inform the other BMSs 212, 214, 216 of the energizing trigger that causes the start of the precharge phase.

The energizing trigger may be applied to the BMS 210 by a user-controlled switch, in two (2) distinct situations. One user-controlled switch is a start button 240 connected to the BMS 210. Another user-controlled switch is a contactor 246 of a charger 242, the contactor 246 also being connected to the BMS 210. The charger 242 includes a plug 244 for connecting to an external power source, for example to a 110 volts AC outlet or to a 220 volts AC outlet (not shown). The contactor 246 closes when the charger 242 is connected to the external power source. The energizing trigger may be applied to the BMS 210 in the form of a transient start command when a user of the electric system 200 depresses the start button 242. The energizing trigger may alternatively be applied to the BMS 210 in the form of a continuous charging command, or latched command, when the contactor 246 is closed.

Figure 3:
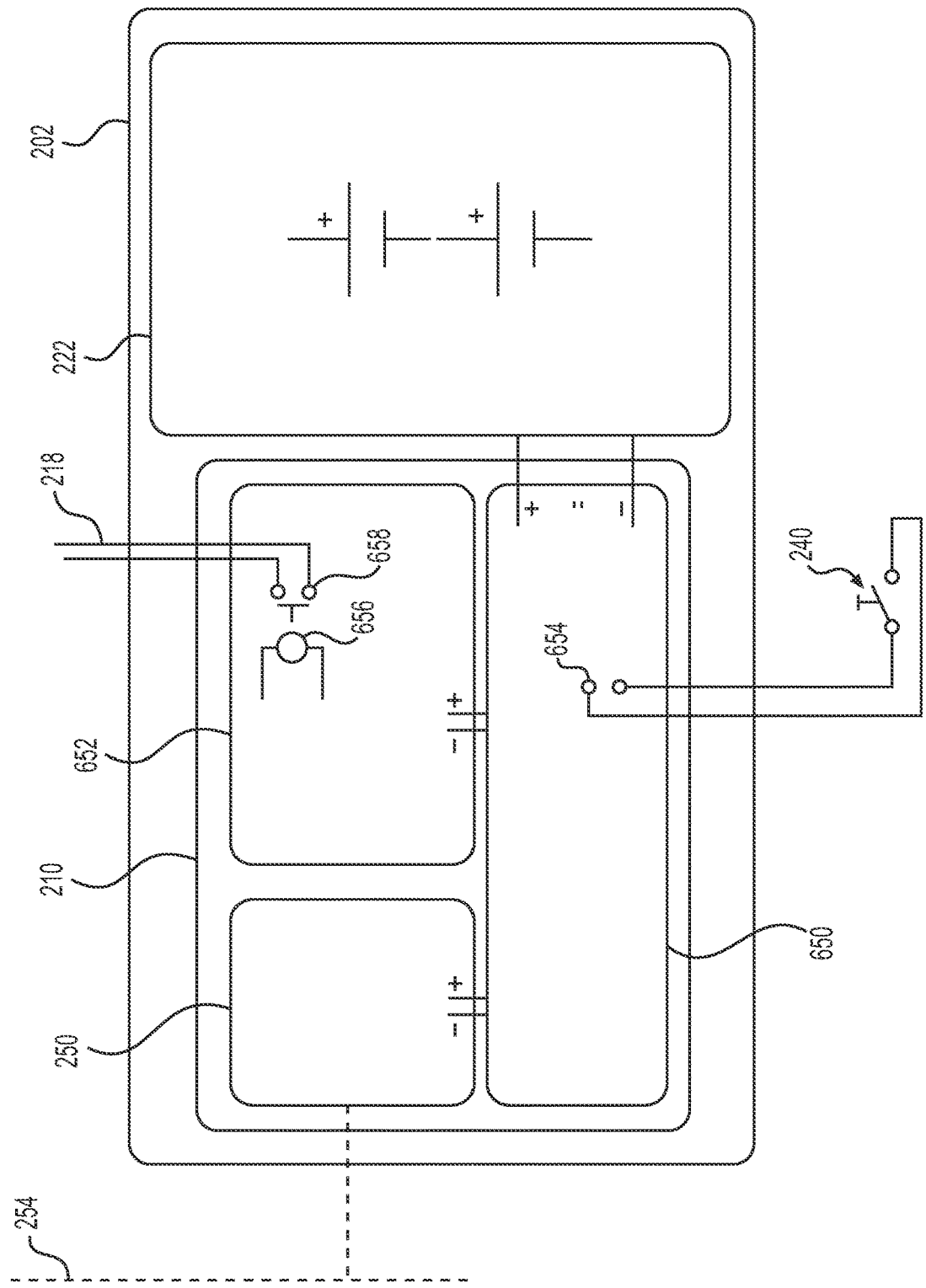
FIG. 3 is a partial view of the electric system of FIG. 2, showing internal details of a battery module.

In an implementation, the energizing trigger is applied in the form of a dry contact closure of the start button 240 or of the contactor 246, this action closing an electric path allowing energy from battery cells contained in the battery module 202 to feed and wake-up the BMS 210. FIG. 3 is a partial view of the electric system of FIG. 2, showing internal details of a battery module. In an implementation, the battery modules 202, 204, 206, 208 are all constructed in the manner as shown on FIG. 3. In particular, FIG. 3 shows the battery module 202 and its connection to the start button 240. The BMS 210 comprises a switching power supply 650, a processor 652, and a communication interface 250. The switching power supply 650 is disconnected from the battery cells 222, and therefore inert, when the BMS 210 is in an inactive state. When the start button 240 or the contactor 246 is closed, providing the energizing trigger, an internal contact 654 of the switching power supply 650 closes and allows the switching power supply 650 to connect to the battery cells 222. The switching power supply 650 thus becomes energized by the battery cells 222. Although the internal contact 654 may open again, if the energizing trigger is released, internal control logic of the switching power supply 650 allows the BMS 210 to remain in a powered state by maintaining a contact with the battery cells 222. The switching power supply 650 energizes the communication interface 250 and the processor 652. Once energized, the processor 652 performs initialization operations that are described hereinbelow. The processor 652 energizes an internal coil 656 to cause closing of an internal contact 658 electrically connected to the connection 218. This action of the BMS 210 emulates the dry contact closure of the start button 240 or of the contactor 246 and effectively causes, within the BMS 212, a closure of a corresponding internal contact, such as the contact 654, for activating the BMS 212. By this action, the energizing trigger is cascaded from the BMS 210 to the BMSs 212, 214 and 216. More broadly, closure of the internal contact 658 establishes a communication between the BMSs 210, 212, 214 and 216 over the connection 218.

In an implementation, the first battery module 202 includes an activation switch 220 on which the above-mentioned energizing trigger is applied. The activation switch 220 may either be a physical switch distinct from the BMS 210 or may instead be integrated within the BMS 210. Other contemplated techniques for implementing the energizing trigger include the detection of a current flowing between the activation switch 220 and the start button 240 or the contactor 246, or the provision of digital signaling information from the start button 240 or from the contactor 246 to the activation switch 220. In the same or another implementation, the energizing trigger may be applied to the activation switch 220 by an electronic device (not shown) replacing the start button 240 and the contactor 246, the electronic device including a small battery (not shown), for example a lithium-ion watch battery.

A format of information transmitted on the connection 218 from the BMS 210 to the BMSs 212, 214, 216 about the energizing trigger may differ from a format of the energizing trigger as received by the BMS 210. In an implementation, the connection 218 is an electrical connection between the BMSs 210, 212, 214, 216 and the BMS 210 emulates the closure of a dry contact so that the BMSs 212, 214, 216 may wake up in the same manner as illustrated in the foregoing description of FIG. 3. In another implementation, the information transmitted on the connection 218 may be realized as a digital signal.

Resulting from the application of the energizing trigger on the BMS 210 of the first battery module 202, the BMS 210 energizes a coil 248 operatively connected to the first contactor 230. The first contactor 230 closes, effectively closing the switched current-limiting path 286 so that the two battery subassemblies 282, 284 become connected in series via the current limiter that includes the resistor 232 for precharging the electric system 200. The resistor 232 limits a current flowing through the battery modules 202, 204, 206, 208 during the precharge phase. The resistor 232 has a current-limiting value and a power rating that are adapted for dissipating energy created in the resistor 232 by the current flowing therethrough. This current is transient in nature and rapidly reduces as the voltage between the positive terminal $224_4$ of the fourth battery module 208 and the negative terminal $226_1$ of the first battery module 202 is reaching the 96V nominal system voltage while charging capacitances (not shown) of elements of the electric system 200. As a result, a voltage available between the positive terminal $224_4$ of the fourth battery module 208 and the negative terminal $226_1$ of the first battery module 202 rapidly increases toward the 96 volts nominal system voltage.

At least one of the battery modules 202, 204, 206, 208 includes the communication interface 250 controlled by the respective BMS 210, 212, 214, 216 and communicatively coupled to a system controller for the electric system 200, for example an electric vehicle module (EVM) 252, via a system bus 254. The at least one communication interface 250 informs the EVM 252, via the system bus 254, of the energizing trigger. This information forwarded to the EVM 252 is either in the form of an indication of a start command, if the energizing trigger applied to the BMS 210 is a transient start command indicating a start of the electric system 200, or in the form of an indication of a charging command, if the energizing trigger is a continuous charging command, or latch, indicating that the battery modules 202, 204, 206 and 208 of the electric system 200 are being recharged. A format of the indication forwarded on the system bus 254 may differ from a format of the energizing trigger as applied to the BMS 210. Generally speaking, the forwarded indication may include a binary information element indicating the nature of the energizing trigger. Otherwise stated, the indication does not need to be continuously present on the system bus 254 while the battery modules 202, 204, 206 and 208 of the electric system 200 are being recharged.

In the battery modules 202, 204, 206, 208, the communication interface 250 may be operatively connected to the corresponding BMS 210, 212, 214, 216. Alternatively, the communication interface 250 may form an integral part of the BMS 210, 212, 214, 216. As all BMSs 210, 212, 214, 216 are interconnected and because information about the energizing trigger is forwarded from the BMS 210 to the other BMSs 212, 214, 216, any one of the battery modules 202, 204, 206, 208 may inform EVM 252 of the energizing trigger via its communication interface 250 and via the system bus 254. In an implementation, the EVM 252 is made aware, via the system 254, of proper handling of information about the energizing trigger by each of the BMSs 212, 214, 216.

In an implementation, the EVM 252 is energized by a voltage converter 256, for example a DC/DC converter, that converts the nominal system voltage of 96 volts to a control voltage of 12 volts present between DC leads 290 and 292. In a mode of operation, after closing of the first contactor 230 to close the switched current-limiting path 286, the voltage converter 256 rapidly provides the 12 volts control voltage to the EVM 252. In turn, the EVM 252 energizes a coil 258 that is operatively connected to the second contactor 234. This action closes the second contactor 234, in turn closing the switched non-current-limiting path 288 of the interrupter 228. The two battery subassemblies 282, 284 including the four (4) battery modules 202, 204, 206, 208 are now ready to deliver electric power to the electric system 200 without the current limiter, at the 96 volts nominal system voltage and at a current rating of the battery modules 202, 204, 206, 208. Once energized, the EVM 252 generally controls the various components of the electric system 200.

Energizing the coil 258 to close the second contactor 234 may take place as soon as the EVM 252 is energized. Alternatively, in an implementation, the EVM 252 may wait until it has received information about the energizing trigger on the system bus 254 and has performed various system verification tasks before triggering the energizing of the electric system 200 without the current limiter by energizing the coil 258. In the same or another implementation, energizing the coil 258 may take place after each of the BMSs 210, 212, 214, 216 has informed the EVM 252 of their successful initialization. In the same or other implementations, the EVM 252 may delay energizing of the coil 258 until one or more of the following conditions is met: a minimum time delay having been spent after the closing of the switched current-limiting path 286 by the closing of the first contactor 230, a voltage sensed on a load-side of the electric system 200, on the DC leads 278, 280, between the positive terminal $224_4$ of the fourth battery module 208 and the negative terminal $226_1$ of the first battery module 202 having reached a minimum voltage threshold close to the nominal system voltage, or a current flowing through the first and second battery subassemblies 282, 284 has fallen below a maximum current threshold.

In an implementation, once in a "run" state, the EVM 252 may signal the BMS 210 of the battery module 202, via the system bus 254, to enter a shutdown sequence. Alternatively, the EVM 252 may receive a signal from the BMS 210 and enter the shutdown sequence. The EVM 252 de-energizes the coil 258 at the end of the shutdown sequence, resulting in the opening of the second contactor 234 and removal of the control voltage on the EVM 252.

In the implementation as shown, the electric system 200 further includes additional components including a motor control module (MCM) 128 and a motor 130. The MCM 128 is energized by the control voltage supplied between DC leads 294 and 292 for logical operations taking place in the MCM 128 and by the nominal system voltage, via the DC leads 278 and 280, for power delivery to the motor 130. The motor 130 may be a DC motor rated to operate at the nominal system voltage. Alternatively, the motor 130 may be an AC motor, for example a three-phase AC motor or a multi-phase AC motor, operating at an AC voltage provided by an inverter of the MCM 128. An example of an inverter is shown in a later Figure. The EVM 252 provides commands to the MCM 128 via a driving bus 260 to control operation of the motor 130, for example for acceleration and deceleration of the motor 130, based on throttling commands provided by a user and received at the EVM 252. In an implementation, when the energizing trigger is in the form of a continuous start command, indicating that the charger 242 is connected to the external power source for recharging the battery modules 202, 204, 206, 208, the EVM 252 may refrain from sending, to the MCM 128 via the driving bus 260, any command that could lead to operation of the motor 130.

In an implementation, when the motor 130 is subject to a braking force, it may return electric power to the MCM 128. In turn, the MCM 128 converts the received electric power to the nominal system voltage applied to recharge the battery modules 202, 204, 206, 208. In an implementation where the electric system 200 is integrated in a hybrid vehicle, the motor 130 may return electric power to the MCM 128 when an internal combustion engine (not shown) mechanically drives the motor 130.

In the implementation as shown, other components of the electric system 200 include an instrument cluster 262 powered by the control voltage on the DC leads 290, 292 and communicatively coupled with the EVM 252 via the system bus 254. The instrument cluster 262 may for example display information about a current charge of the battery assembly as well as other useful information such as a current ambient temperature, the time of day, and the like. A parking brake module (PBM) 264, a vehicle immobilizer module (VIM) 266 operatively connected to the EVM 252 for providing authorization to activate the vehicle propulsion and providing an emergency or stop command to the EVM 252, an emergency stop switch 268, for example the conventional "red button" on a motorcycle, operable by the user of the electric system 200 for providing an emergency stop command to the EVM 252, a hazard switch 270 operable by the user of the electric system 200 for controlling, via the EVM 252, turning on of a flashing hazard light via a hazard relay coil 272 are also included in the electric system 200 of FIG. 2. In an implementation, when the hazard switch 270 has been used to turn on the flashing hazard light, a variant of the shutdown sequence may comprise keeping the coil 258 energized so that the EVM 252 remains energized and keeps the hazard relay coil 272 energized until the hazard switch 270 removes its command.

A key switch 274 connected to a vehicle key (not shown) of a vehicle integrating the electric system 200 is provided to prevent powering the MCM 128 with the control voltage by opening a connection between the DC leads 290 and 294 when the vehicle switch is not present. This vehicle key may further be connected to the VIM 266 and attached to the user so that the vehicle will stop should the user fall from the vehicle. The MCM 128 may regularly send continuity messages, for example heartbeat messages, to the EVM 252 on the condition that the vehicle key remains attached to the vehicle. For some applications, a secondary voltage converter 276 may provide an accessory voltage, in particular, but not exclusively, an accessory voltage higher than the control voltage, for example 13.5 volts, for powering demanding accessories such as for example an assisted electric power steering (not shown).

Figure 4:
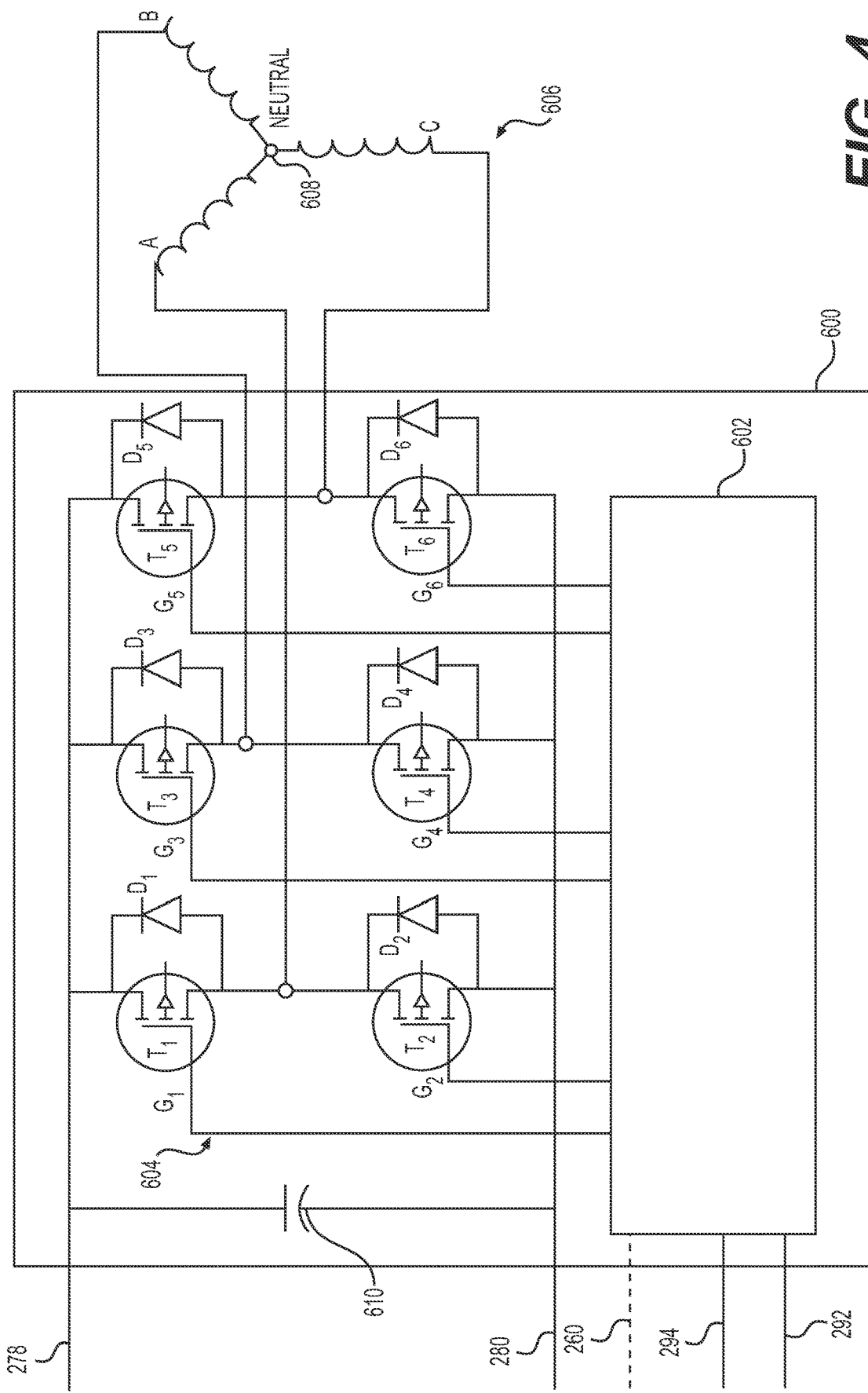
FIG. 4 is another partial view of the electric system of FIG. 2, in an implementation having an AC motor control module (MCM) and an AC motor.

FIG. 4 is another partial view of the electric system of FIG. 2, in an implementation having an AC motor control module (MCM) 600 and an AC motor 606. FIG. 4 shows the MCM 600 having an input capacitor 610, a processor 602 and an inverter 604 for driving the AC motor 606. The input capacitor 610 is initially charged at the nominal system voltage during the precharge phase. The processor 602 is powered by the voltage converter 256 at 12 volts on DC leads 294, 292 while the inverter is powered at 96 volts on the DC leads 278, 280. The processor 602 receives commands from the EVM 252 via the driving bus 260 to control operation of the motor 606. The processor 602 in turn converts these commands into control signals applied to gates $G_1$-$G_6$ of transistors $T_1$-$T_6$ of the inverter 604. As shown on FIG. 4, the inverter 604 also includes freewheel diodes $D_1$-$D_6$ that are used to attenuate transient overvoltage that occurs upon switching on and off of the transistors $T_1$-$T_6$. The AC motor 606 has three (3) phases A, B and C connected to in a star arrangement to a neutral point 608, each one of the phases A, B and C being connected between corresponding pairs of the transistors $T_1$-$T_6$. The 96 volts power from the battery modules 202, 204, 206, 208 is converted by the inverter 604 into a three-phase AC voltage applied to the three phases A, C and C of the AC motor 606.

Figure 5:
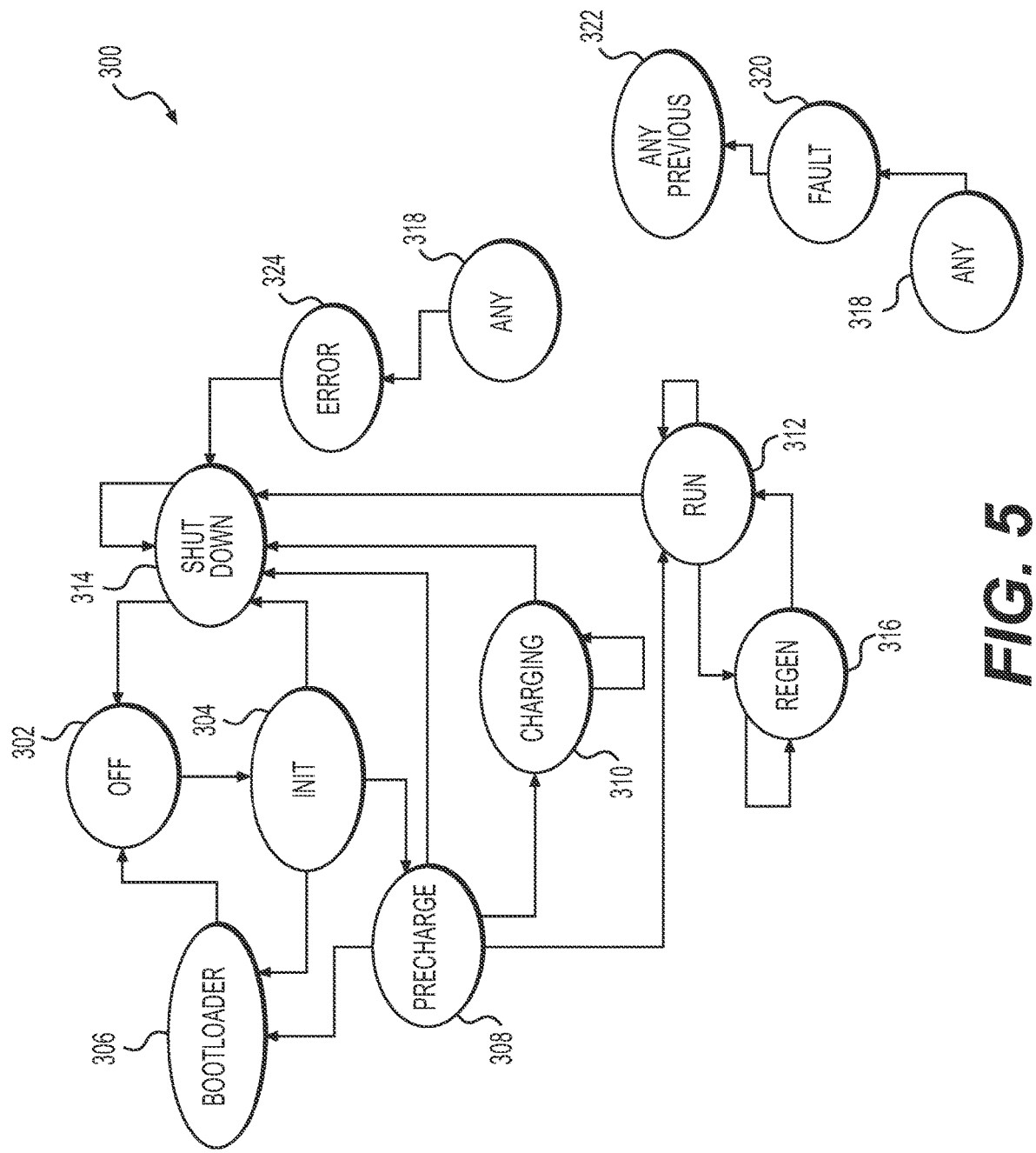
FIG. 5 is a finite state diagram of a battery management system (BMS)

FIG. 5 is a finite state diagram of a battery management system (BMS). In an implementation, a finite state diagram 300 shown on FIG. 5 is applicable to the BMS 210 of the first battery module 202. In the same or another implementation, the finite state diagram 300 is also applicable to the BMSs 212, 214 and 216. The diagram 300 illustrates many possible state variations of the BMS 210. In an implementation, the states that are illustrated in the diagram 300 are software states of the BMS 210. The following description of these states will be best understood considering FIG. 2 and its description.

An initial state of the BMS 210 is an "Off" state 302, when the electric system 200 is not operating (i.e. not turned on by the user) and when the charger 242 is not connected to the external power source. The BMS 210 is not powered in the Off state 302. In this initial state, the battery modules 202, 204, 206, 208 may be charged, partially charged, or not charged.

The BMS 210 transits from the Off state 302 to an "Initialization" state 304 in a wake-up condition of the electric system 200, when one of the start button 240 or the contactor 246 applies the energizing trigger to the BMS 210. Now energized and awake, the BMS 210 executes system verification tasks while in the Initialization state 304. One of the verifications made by the BMS 210 may comprise a confirmation of a communication, via the connection 218, to the other BMSs 212, 214 and 216. Any failure of the tasks performed by the BMS 210 while in the Initialization state 304 causes the BMS 210 to move to a "Shutdown" state 314, which is described hereinbelow. After completion of the tasks of the Shutdown state 314, the BMS 210 terminates its processing functions, cuts a connection between the battery cells 222, and returns to the Off state 302.

The wake-up condition may be present when the BMS 210 receives, via the system bus 254, an indication that the electric system 200 is connected to a computer or similar device (not shown), in which case the BMS 210 transits from the Initialization state 304 to a "Bootloader" state 306 for receiving a firmware update, or a calibration update. The BMS 210 normally returns to the Off state 302 once the update is completed.

Alternatively the wake-up condition may be present when the energizing trigger is applied to the BMS 210 in one of the above-described manners, following which the BMS 210 moves to a "Precharge" state 308. In the Precharge state 308, the BMS 210 energizes the coil 248 to close the contactor 230 and to thereby close the switched current-limiting path 286 of the interrupter 228 for a period of time, generally until a minimum time period has expired or until a current flowing through the battery modules 202, 204, 206, 208 and through the resistor 232 falls below a predetermined value. Instead of a current measurement, a voltage measurement of the battery module 202 or voltage measurements of several of the battery modules 202, 204, 206, 208 is also contemplated for determining when the BMS 210 is ready to move to a next state. Thereafter, the BMS 210 may move from the Precharge state 308 to a "Charging" state 310, if the energizing trigger is a continuous charging command, indicating that the battery modules 202, 204, 206 and 208 of the electric system 200 are being recharged. Alternatively, the BMS 210 may move to a "Run" state 312, if the energizing trigger is a transient start command, indicating a start of the electric system 200. In an implementation, a timing for the change of state of the BMS 210 from the Precharge state 308 to the Charging state 310 or to the Run state 312 may be controlled at least in part through a signal received from the EVM 252, via the system bus 254. In the Charging state 310 or in the Run state 312, the BMS 210 de-energizes the coil 248 to open the contactor 230 and thereby open the switched current-limiting path 286 of the interrupter 228.

If the BMS 210 receives, via the system bus 254, an indication that the electric system is connected to a source of a firmware update or a source of a calibration update while in the Precharge state 308, the BMS 210 may move from the Precharge state 308 to the Bootloader state 306.

Having entered the Charging state 310, the BMS 210 may remain in that state for as long as the charger 242 is connected to the external power source and applies the energizing trigger. Trickle charging of the battery modules 202, 204, 206, 208 may take place while the BMS 210 is in the Charging state 310. Following a disconnection of the charger 242, the BMS 210 moves to the Shutdown state 314, during which it sends a disconnect indication to the EVM 252 on the system bus 254, and then to the Off state 302.

Having entered the Run state 312 following a start of the electric system 200, the BMS 210 may remain in that state for as long as the electric system 200 is not stopped by the user or by an abnormal condition. In a hybrid vehicle implementation where the motor 130 is configured to return electric power to the MCM 128 (or to the MCM 600) when subject to a braking force and where the MCM 128 is configured to convert the received electric power to the nominal system voltage applied to recharge the battery modules 202, 204, 206, 208, the BMS 210 may adopt a "Regeneration" state 316 while the battery modules 202, 204, 206, 208 are being recharged by action of the motor 130. The BMS 210 returns to the Run state 312 when the motor 130 stops recharging the electric system 312. The BMS 210 may repeatedly alternate between the Run state 312 and the Regeneration state 316 during operation of the electric system 200. When the electric system 200 is stopped by the user or by an abnormal condition, the BMS 210 moves to the Shutdown state 314, during which it may send a disconnect indication to the EVM 252 on the system bus 254 if the stoppage or abnormal condition is first detected by the BMS 210, and then to the Off state 302.

Abnormal conditions may eventually be detected by various components of the electric system 200 or by the user while the BMS 210 is in any of the previously described states. An abnormal condition may be detected by the BMS 210 or by one of the other BMSs 212, 214 or 216. If the abnormal condition is detected by the BMS 210, the BMS 210 may inform the EVM 252 via the system bus 254. The abnormal condition may also be detected by the EVM 252, either directly or by action of the VIM 266, of the emergency stop switch 268 or of the hazard switch 270. The abnormal condition may further be detected by the MCM 128, which in turn provides information to the EVM 252 via the driving bus 260. The BMS 210 is informed of the abnormal condition detected by the EVM 252 or by the BMSs 212, 214 or 216 via the system bus 254. In an implementation, one or more of the BMSs 210, 212, 214, 216 may be configured to detect an abnormal voltage and/or a temperature of the respective battery module 202, 204, 206, 208, or an excessive current flowing therethrough. Use of other sources of abnormal condition may be contemplated, including for example sensors of the control voltage and/or sensors of the nominal system voltage, sensors coupled to the motor 130 for detecting a temperature of the motor 130, and the like.

A state of the BMS 210 upon detection of an abnormal condition is illustrated as "Any" state 318 on FIG. 5. Some abnormal conditions are not severe and only need to be recorded in a log of the BMS 210 for troubleshooting at a later time. Possible examples of such abnormal conditions include, without limitation, a level of current flowing through the battery modules 202, 204, 206, 208 exceeding a first current threshold, or a temperature of the battery modules 202, 204, 206, 208 exceeding a first temperature threshold. An abnormal condition may also be related to an abnormally low temperature or voltage of the battery modules 202, 204, 206, 208. When an abnormal condition of low severity is detected, the BMS 210 moves to a "Fault" state 320 and records information about the abnormal condition. The BMS 210 then returns to the previous state, illustrate as "Any Previous" state 322. In an implementation, the BMS 210 may send a signal via the system bus 254 to the EVM 252 before returning to the Run state 320 so that the EVM 252 is aware of the abnormal condition. If however a detected abnormal condition has a high severity, for example when the abnormal condition could lead to damage or to an unsafe operation of the electric system 200, the BMS 210 moves to an "Error" state 324. Possible examples of such error conditions include, without limitation, a level of current flowing through the battery modules 202, 204, 206, 208 exceeding a second current threshold greater than the first current threshold, or a temperature of the battery modules 202, 204, 206, 208 exceeding a second temperature threshold greater than the first temperature threshold. An error condition may also be related to an abnormally low temperature or voltage of the battery modules 202, 204, 206, 208. The log of the BMS 210 records information about the abnormal condition for troubleshooting purposes. In an implementation, the BMS 210 may send a signal via the system bus 254 to the EVM 252 so that the EVM 252 is informed of the abnormal condition. The BMS 210 then moves to the Shutdown state 314 followed by the Off state 302.

Details of operation in the BMS 210 in the Shutdown state 314 may vary according to the reasons for entering this state. Shutdown of the electric system 200 may be initiated by the BMS 210, by the EVM 252, or by another component of the electric system 200 forwarding an error indication to the BMS 210 or to the EVM 252. If the BMS 210 initiates shutdown of the electric system 200, the BMS 210 provides a shutdown indication to the EVM 252. If the EVM 252 initiates shutdown of the electric system 200, the EVM2 252 provides a shutdown indication to the BMS 210. In an implementation, a plurality of signals may be exchanged between the BMS 210 and the EVM 252 while the BMS 210 is in the Shutdown state 314. The BMS 210 leaves the Shutdown state 314 when all activities of the battery module 202 are ready for termination and enters the Off state 302.

Figure 6:
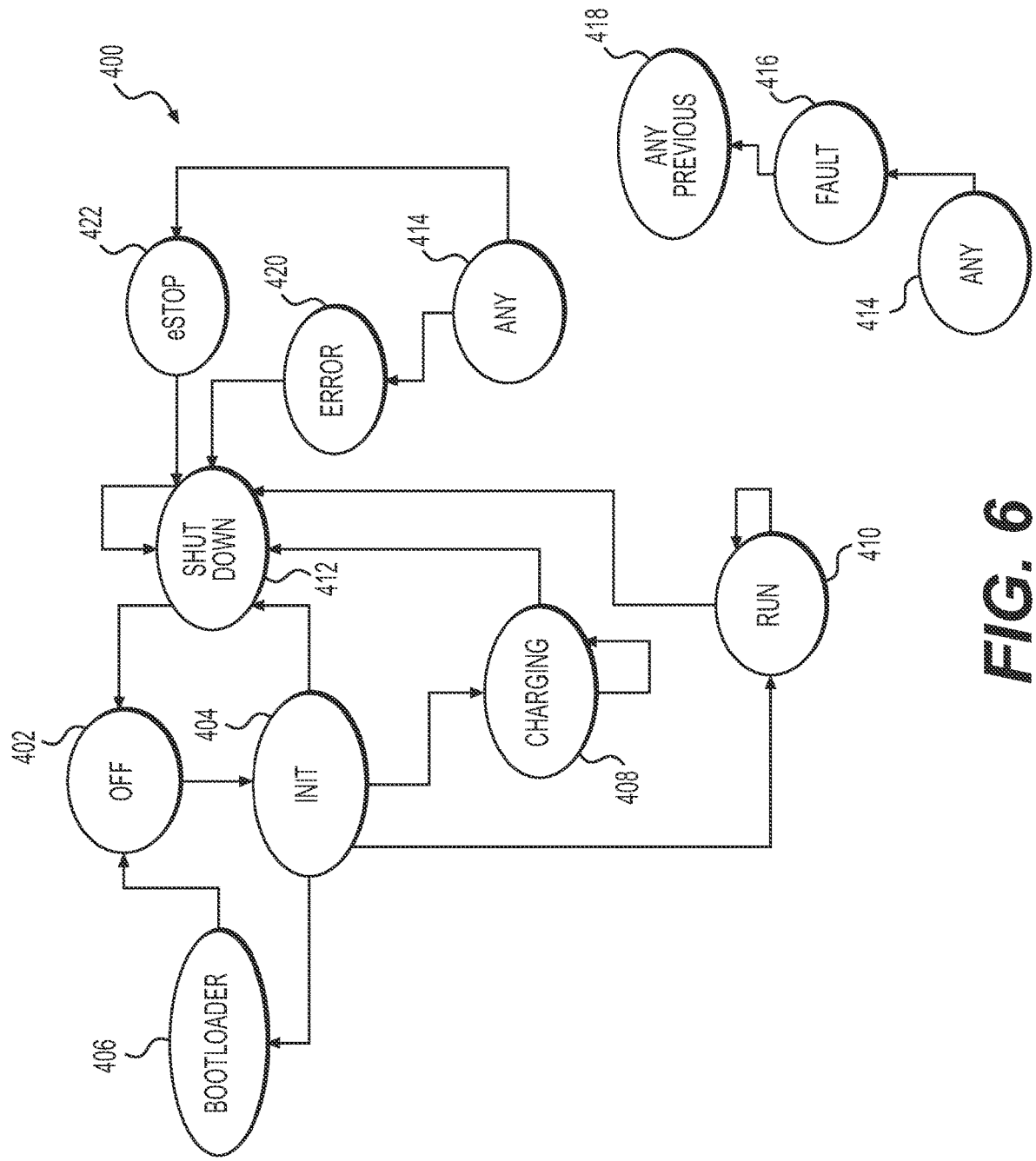
FIG. 6 is a finite state diagram of an electric vehicle module (EVM)

FIG. 6 is a finite state diagram of an electric vehicle module (EVM). A finite state diagram 400 shown on FIG. 6 is applicable to the EVM 252. The diagram 400 illustrates most possible state variations of the EVM 252. In an implementation, the states that are illustrated in the diagram 400 are software states of the EVM 252. The following description of these states will be best understood considering FIG. 2 and its description.

An initial state of the EVM 252 is an "Off "state 402, when the electric system 200 is not operating (i.e. not turned on by the user) and when the charger 242 is not connected to the external power source. The EVM 252 transits from the Off state 402 to an "Initialization" state 404 upon wake-up of the electric system 200. The EVM 252 executes system verification tasks while in the Initialization state 404. Any failure of the tasks performed by the EVM 252 while in the Initialization state 404 causes the EVM 252 to move to a "Shutdown" state 412, which is described hereinbelow. After completion of the tasks of the Shutdown state 412, the EVM 252 returns to the Off state 402.

The wake-up condition may be present when the EVM 252 receives, via the system bus 254, an indication that the electric system 200 is connected to a computer or similar device (not shown), in which case the EVM 252 transits from the Initialization state 404 to a "Bootloader" state 406 for receiving a software update, a firmware update, or a calibration update. The EVM 252 normally returns to the Off state 402 once the update is completed.

Alternatively the wake-up condition may be a consequence of the energizing trigger applied to the BMS 210 and of resulting operations in the BMS 210 and in the battery modules 202, 204, 206, 208. The EVM 252 enters the Initialization state 404 when it becomes powered by the voltage converter 256, substantially at the control voltage, shortly after the closing of the switched current-limiting path 286 in the interrupter 228. The EVM 252 moves from the Initialization state 404 to a "Charging" state 408 or to a "Run" state 410 when it receives information about the energizing trigger from one of the BMS 210, 212, 214, 216 via the system bus 254. In an implementation, the EVM 252 waits until all the BMS 210, 212, 214, 216 have reported their successful initialization before moving to the Charging state 408 or to the Run state 410. The EVM 252 either moves from the Initialization state 404 to the Charging state 408 or to the Run state 410 depending on the nature of the energizing trigger. If the energizing trigger is a continuous charging command, indicating that the battery modules 202, 204, 206 and 208 of the electric system 200 are being recharged, the EVM 252 moves to the Charging state 408. If the energizing trigger is a transient start command, indicating a start of the electric system 200, the EVM 252 moves to the Run state 410. In an implementation, the EVM 252 may enter the Run state 410 when the vehicle key is rotated and locked in a "running" position of a vehicle key cylinder (not shown) to close the key switch 274. Whether in the Charging state 408 or in the Run state 410, the EVM 252 energizes the coil 258 to close the contactor 234 and thereby close the switched non-current-limiting path 288 of the interrupter 228. The coil 258 will remain energized until shutdown of the electric system 200. Following closing of the switched non-current-limiting path 288 of the interrupter 228, the EVM 252 sends a signal to the BMS 210 via the system bus 254 to allow charging of the battery modules 202, 204, 206, 208 or to allow running of the electric system 200. In response, the BMS 210 moves from its Precharge state 308 to its Charging state 310 or to its Run state 312, depending on the nature of the signal received from the EVM 252.

Having entered the Charging state 408, the EVM 252 may remain in that state for as long as the charger 242 is connected to the external power source and applies the energizing trigger to the BMS 210. Following a disconnection of the charger 242, as a part of the tasks executed in its Shutdown state 314, the BMS 210 forwards a disconnect indication to the EVM 252 via the system bus 254. The EVM 252 moves to a Shutdown state 412, which is described hereinbelow. After completion of the tasks of the Shutdown state 412, the EVM 252 returns to the Off state 402.

Having entered the Run state 410 following a start of the electric system 200, the EVM 252 may remain in that state for as long as the electric system 200 is not stopped by the user or by an abnormal condition. When the electric system 200 is stopped by the user or by an abnormal condition, the EVM 252 moves to the Shutdown state 412 and then to the Off state 402. If the stoppage or abnormal condition is first detected by the BMS 210, the EVM 252 may enter the Shutdown state 412 following receipt, on the system bus 254, of a disconnect indication from the BMS 210.

Abnormal conditions may eventually be detected by various components of the electric system 200 or by the user while the EVM 252 is in any of the previously described states. Events that may lead to the detection of an abnormal condition are described in the foregoing description of FIG. 5. If the abnormal condition is detected by one of the BMS 201, 212, 214, 216, information about the abnormal condition is forwarded to the EVM 252 via the system bus 254, for example in the form of a disconnect indication.

A state of the EVM 252 upon detection of an abnormal condition is illustrated as "Any" state 414 on FIG. 6. Some abnormal conditions are not severe and only need to be recorded in a log of the EVM 252 for troubleshooting at a later time. When an abnormal condition of low severity is detected, the EVM 252 moves to a Fault state "416" and records information about the abnormal condition. The EVM 252 then returns to the previous state, illustrate as "Any Previous" state 418. Depending on a type of the abnormal condition having caused the EVM 252 to move to the Fault state 416, the EVM 252 may return to the Run state 410 with an alteration causing a limitation of the commands sent to the MCM 128 via the driving bus 260 in order to control a limited performance of the motor 130; this alteration may for example be applied when a low voltage condition of the battery modules 202, 204, 206, 208 is detected. If however a detected abnormal condition has a high severity, for example when the abnormal condition could lead to damage or to an unsafe operation of the electric system 200, the EVM 252 moves to an "Error" state 420. The log of the EVM 252 records information about the abnormal condition for troubleshooting purposes, and then moves to the Shutdown state 412 followed by the Off state 402.

An "Emergency Stop" state 422 may also follow Any previous state 414 when the user activates the emergency stop switch 268 to stop the electric system 200. Likewise, removal of the vehicle key from the vehicle, causing the opening of the key switch 274, will disconnect the MCM 128 from the control voltage and this event will be detected by the EVM 252, for example by detection of a loss of signaling from the MCM 128, and cause the EVM 252 to enter the Emergency Stop state 422. The Emergency Stop state 422 is also followed by the Shutdown state 412 and by the Off state 402.

Details of operation in the EVM 252 in the Shutdown state 412 may vary according to the reasons for entering this state. Shutdown of the electric system 200 may be initiated by the BMS 210, by the EVM 252, or by another component of the electric system 200 forwarding an error indication to the BMS 210 or to the EVM 252. If the BMS 210 initiates shutdown of the electric system 200, the BMS 210 provides a shutdown indication to the EVM 252. If the EVM 252 initiates shutdown of the electric system 200, the EVM2 252 provides a shutdown indication to the BMS 210. In an implementation, a plurality of signals may be exchanged between the BMS 210 and the EVM 252 while the EVM 252 is in the Shutdown state 412. The EVM 252 de-energizes the coil 258 and leaves the Shutdown state 412 when activities in all components of the electric system 200 are ready for termination and enters the Off state 402.

Figure 7:
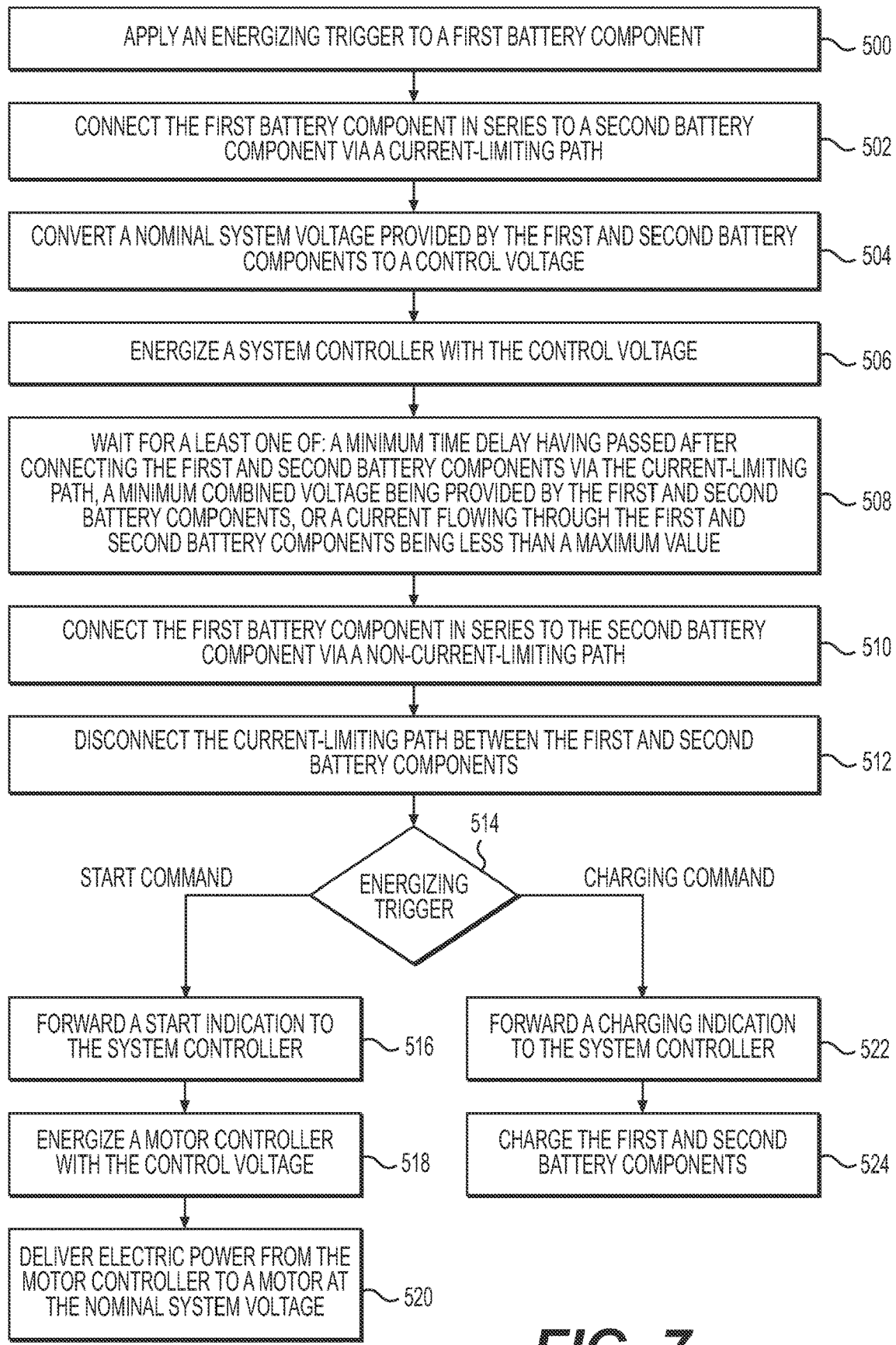
FIG. 7 is a logic diagram for a method for energizing the electric system of FIG. 2 according to an implementation.

FIG. 7 is a logic diagram of a method for energizing the electric system of FIG. 2 according to an implementation. A sequence shown in FIG. 7 comprises a plurality of operations, some of which may be executed in variable order, some of the operations possibly being executed concurrently, and some of the operations being optional.

The sequence starts at operation 500 when the energizing trigger is applied to the first battery subassembly 282 that includes the battery modules 202, 204 in the example of FIG. 2. In response to the energizing trigger, the first battery subassembly 282 is connected in series to the second battery subassembly 284, including the battery modules 206, 208, via the switched current-limiting path 286 of the interrupter 228, at operation 502. The nominal system voltage provided by the first and second battery subassemblies 282, 284 may be converted to the control voltage at operation 504 by the voltage converter 256. The system controller, for example the EVM 252, is energized at operation 506, possibly at the control voltage. The first and second battery subassemblies 282, 284 are then connected in series via the switched non-current-limiting path 288 of the interrupter 228 at operation 510. This operation 510 may either immediately follow operation 506, or may follow operation 508, which includes the electric system 200 waiting for at least one of the following conditions: a minimum time delay having passed after connecting the first and second battery subassemblies 282, 284 via the switched current-limiting path 286, the electric system 200 verifying that a minimum combined voltage is provided by the first and second battery subassemblies 282, 284, or the electric system 200 verifying that a current flowing through the first and second battery subassemblies 282, 284 is less than a maximum value. In an implementation, the verifications of operation 508 are performed by one or more of the BMSs 210, 212, 214, 216.

Following the connection of the first and second battery subassemblies 282, 284 via the switched non-current-limiting path 288 at operation 510, the switched current-limiting path 286 between the first and second battery subassemblies 282, 284 is disconnected at operation 512. Operation 514 considers whether the energizing trigger applied at operation 500 is a start command or a charging command. If the energizing trigger is a start command, a start indication is forwarded to the system controller at operation 516. A motor controller, for example the MCM 128, is energized with the control voltage at operation 518. Delivering electric power from the motor controller to the motor 130 at the nominal voltage follows at operation 520. If the energizing trigger is a charging command, a charging indication is forward to the system controller at operation 522. The first and second battery subassemblies 282, 284 are charged at operation 524. The electric system 200 may then remain in it current state until shutdown.

The electric system and method for energizing the electric system implemented in accordance with some non-limiting implementations of the present technology can be represented as follows, presented in numbered clauses.

Clauses

[Clause 1] An electric system, comprising:
a first battery subassembly;
a second battery subassembly;
an interrupter adapted for connecting the first and second battery subassemblies in series, the interrupter comprising a switched current-limiting path in parallel with a switched non-current-limiting path; and
a system controller electrically connected to the first battery subassembly and to the second battery subassembly; and
the first battery subassembly being adapted for causing closing of the switched current-limiting path when an energizing trigger is applied to the electric system; and
the system controller being adapted for causing closing of the switched non-current-limiting path when energized by the first and second battery subassemblies.

[Clause 2] The electric system of clause 1, further comprising:
a first contactor of the switched current-limiting path and a first coil, the first battery subassembly being adapted for energizing the first coil for closing the first contactor and the switched current-limiting path; and
a second contactor of the switched non-current-limiting path and a second coil, the system controller being adapted for energizing the second coil for closing the second contactor and the switched non-current-limiting path.

[Clause 3] The electric system of any one of clauses 1 or 2, wherein the interrupter further comprises a service switch.

[Clause 4] The electric system of any one of clauses 1 to 3, wherein the current-limiting path comprises a resistor adapted for limiting a current flowing between the first and second battery subassemblies and having a power rating adapted for dissipating an energy caused by the current flowing through the resistor.

[Clause 5] The electric system of any one of clauses 1 to 4, wherein:
the first battery subassembly comprises a first battery module connected in series to a second battery module; and
the second battery subassembly comprises a third battery module connected in series to a fourth battery module.

[Clause 6] The electric system of clause 5, wherein:
the first battery module comprises a first battery management system (BMS) operatively connected to an activation switch, the energizing trigger being applied to the activation switch.

[Clause 7] The electric system of any one of clauses 5 or 6, wherein:
the second battery module comprises a second BMS;
the third battery module comprises a third BMS; and
the fourth battery module comprises a fourth BMS.

[Clause 8] The electric system of clause 7, wherein:
the first BMS is adapted for cascading the energizing trigger to the second BMS;
the second BMS is adapted for cascading the energizing trigger to the third BMS;
the third BMS is adapted for cascading the energizing trigger to the fourth BMS; and
at least one of the first, second, third and fourth BMSs is communicatively coupled to the system controller and is adapted for informing the system controller of the energizing trigger.

[Clause 9] The electric system of clause 8, wherein the at least one of the first, second, third and fourth BMSs is adapted for detecting an abnormal condition and for informing the system controller of the abnormal condition.

[Clause 10] The electric system of clause 9, wherein the at least one of the first, second, third and fourth BMSs is adapted for recording a log of the abnormal condition.

[Clause 11] The electric system of any one of clauses 8 to 10, wherein the system controller is adapted for detecting an abnormal condition and for informing the at least one of the first, second, third and fourth BMSs of the abnormal condition.

[Clause 12] The electric system of clause 11, wherein the system controller is adapted for recording a log of the abnormal condition.

[Clause 13] The electric system of any one of clauses 9 to 12, wherein the abnormal condition is selected from an abnormal voltage of one or more of the first, second, third and fourth battery modules, an abnormal temperature of one or more of the first, second, third and fourth battery modules, an abnormal temperature of a motor powered by the electric system, an excessive level of current flowing through one or more of the first, second, third and fourth battery modules, detection of a user activation of an emergency stop switch, and detection of a user activation of a hazard switch,

[Clause 14] The electric system of any one of clauses 9 to 13, wherein the electric system is adapted for opening the switched non-current-limiting path to shutdown the electric system when the abnormal condition is a severe abnormal condition.

[Clause 15] The electric system of any one of clauses 1 to 14, wherein:
a maximum operating voltage of each of the first and second battery subassemblies individually is less than a high voltage limit; and
when the switched non-current-limiting path is closed, a combined voltage of the first and second battery subassemblies is greater than the high voltage limit.

[Clause 16] The electric system of clause 15, wherein the high voltage limit is 60 Volts.

[Clause 17] The electric system of any one of clauses 1 to 16, wherein a combined voltage of the first and second battery subassemblies is 96 volts.

[Clause 18] The electric system of any one of clauses 1 to 17, wherein the first and second battery subassemblies provide a nominal system voltage when connected in series.

[Clause 19] The electric system of clause 18, further comprising:
a voltage converter adapted for converting the nominal system voltage to a control voltage, the nominal system voltage being greater than the control voltage;
wherein the system controller is adapted for being energized with the control voltage.

[Clause 20] The electric system of clause 19, further comprising:
a motor; and
a motor controller adapted for being energized with the control voltage and for delivering electric power from the first and second battery subassemblies to the motor at the nominal system voltage.

[Clause 21] The electric system of clause 20, wherein:
the motor is an AC motor; and
the motor controller is an AC motor controller further comprising an inverter adapted for converting the nominal system voltage into an AC voltage and for delivering electric power from the first and second battery subassemblies to the AC motor at the AC voltage.

[Clause 22] The electric system of clause 21, wherein:
the AC motor is a multi-phase motor; and
the inverter is adapted for delivering electric power from the first and second battery subassemblies to the multi-phase motor at a multi-phase AC voltage.

[Clause 23] The electric system of any one of clauses 20 to 22, wherein:
the motor is adapted for delivering electric power to the motor controller when a braking force is applied to the motor; and
the motor controller is adapted for delivering electric power to the first and second battery subassemblies when the braking force is applied to the motor.

[Clause 24] The electric system of any one of clauses 1 to 23, wherein the system controller is adapted for closing the switched non-current-limiting path when a condition is met, the condition being selected from at least one of a minimum time delay having been spent after the closing of the switched current-limiting path, a voltage provided by the first and second battery subassemblies having reached a minimum voltage threshold, and a current flowing through the first and second battery subassemblies having fallen below a maximum current threshold.

[Clause 25] The electric system of any one of clauses 1 to 24, further comprising a start button operatively connected to the first battery subassembly, the start button being adapted for providing the energizing trigger for starting the electric system.

[Clause 26] The electric system of any one of clauses 1 to 24, further comprising a charger switch operatively connected to the first battery subassembly, the charger switch being adapted for providing the energizing trigger and for delivering electric power for charging the first and second battery subassemblies.

[Clause 27] The electric system of any one of clauses 1 to 26, wherein the system controller is adapted for signaling to the first battery subassembly when the switched non-current-limiting path is closed, and wherein the first battery subassembly is adapted for opening the switched current-limiting path in response to receiving the signaling.

[Clause 28] The electric system of clause 27, wherein the system controller is adapted for opening the switched non-current-limiting path to shutdown the electric system.

[Clause 29] A vehicle comprising the electric system of any one of clauses 1 to 28, the vehicle being an electric or hybrid vehicle.

[Clause 30] A method for energizing an electric system, comprising:
applying an energizing trigger to a first battery subassembly;
in response to the energizing trigger, connecting the first battery subassembly in series to a second battery subassembly via a current-limiting path;
delivering electric power from the first and second battery subassemblies to energize a system controller; and
once the system controller is energized, connecting the first battery subassembly in series to the second battery subassembly via a non-current-limiting path.

[Clause 31] The method of clause 30, wherein the first and second battery subassemblies provide a nominal system voltage when connected in series.

[Clause 32] The method of clause 31, further comprising:
converting the nominal system voltage to a control voltage, the nominal system voltage being greater than the control voltage; and
energizing the system controller with the control voltage.

[Clause 33] The method of clause 32, wherein the electric system comprises a motor and a motor controller, the method further comprising:
energizing the motor controller with the control voltage; and
delivering electric power from the motor controller to the motor at the nominal system voltage.

[Clause 34] The method of clause 33, wherein the motor is an AC motor, the method further comprising:
energizing the motor controller with the control voltage;
converting the nominal system voltage into an AC voltage; and
delivering electric power from the motor controller to the motor at the AC voltage.

[Clause 35] The method of clause 34, wherein:
the AC motor is a multi-phase motor; and
the electric power is delivered to the multi-phase motor at a multi-phase AC voltage.

[Clause 36] The method of any one of clauses 30 to 35, wherein:
the first battery subassembly comprises a first battery module connected in series to a second battery module; and
the second battery subassembly comprises a third battery module connected in series to a fourth battery module.

[Clause 37] The method of clause 36, wherein the energizing trigger is applied to the first battery module, the method further comprising successively cascading the energizing trigger from the first battery module to the second, third and fourth battery modules.

[Clause 38] The method of clause 36 or 37, wherein connecting the first battery subassembly to the second battery subassembly is controlled by the first battery module.

[Clause 39] The method of any one of clauses 30 to 38, wherein the current-limiting path is in parallel with the non-current-limiting path, the method further comprising closing a service switch in series with the current-limiting and non-current-limiting paths.

[Clause 40] The method of any one of clauses 30 to 39, wherein:
the energizing trigger is a start command;
the first battery subassembly or the second battery subassembly forwards an indication of the start command to the system controller; and
the system controller controls an operation of the electric system in response to the indication of the start command.

[Clause 41] The method of clause 40, wherein the start command is a transient command.

[Clause 42] The method of any one of clauses 30 to 39, wherein:
the energizing trigger is a charging command;
the first battery subassembly or the second battery subassembly forwards an indication of the charging command to the system controller; and
the system controller controls charging of the first and second battery subassemblies in response to the indication of the charging command.

[Clause 43] The method of clause 42, wherein the charging command is a continuous command.

[Clause 44] The method of any one of clauses 30 to 43, wherein connecting the first battery subassembly in series to the second battery subassembly via the non-current-limiting path is delayed until a condition is met, the condition being selected from at least one of a minimum time delay having been spent after connecting the first and second battery subassemblies via the current-limiting path, a voltage sensed on a load-side of the electric system having reached a minimum voltage threshold, and a current flowing through the first and second battery subassemblies having fallen below a maximum current threshold.

[Clause 45] The method of any one of clauses 30 to 44, further comprising disconnecting the current-limiting path between the first and second battery subassemblies after connecting the first and second battery subassemblies via the non-current-limiting path.

[Clause 46] The method of clause 45, further comprising opening the non-current-limiting path to shutdown the electric system.

[Clause 47] An electric system, comprising:
a battery assembly;
a current limiter; and
a first battery management system (BMS) adapted for causing the battery assembly to energize the electric system using the current limiter upon a start of a precharge phase and for causing the battery assembly to energize the electric system without the current limiter following a completion of the precharge phase.

[Clause 48] A method for energizing an electric system, comprising:
applying an energizing trigger to the electric system;
in response to the energizing trigger, energizing the electric system from a current-limited battery source during a precharge phase; and
following completion of the precharge phase, energizing the electric system from a non-current-limited battery source.

[Clause 49] An electric system comprising:
a first battery module comprising at least one first battery cell, a first battery management system (BMS) and a first BMS switching power supply, the at least one first battery cell and the first BMS switching power supply being disconnected when the first BMS is in an inactive state, the at least one first battery cell and the first BMS switching power supply being connected when the first BMS is in a powered state;

a second battery module electrically connectable to the first battery module, the second battery module comprising at least one second battery cell, a second BMS and a second BMS switching power supply, the at least one second battery cell and the second BMS switching power supply being disconnected when the second BMS is in an inactive state, the at least one second battery cell and the second BMS switching power supply being connected when the second BMS is in a powered state; and a user-controlled switch adapted for causing a connection of the at least one first battery cell to the first BMS switching power supply for energizing the first BMS and for changing the first BMS from the inactive state to the powered state;

the first BMS being adapted for causing a connection of the at least one second battery cell to the second BMS switching power supply for energizing of the second BMS and for changing the second BMS from the inactive state to the powered state when the first BMS is in the powered state;

the first BMS being further adapted for closing a current-limiting path placed in series between the first and second battery modules to start a precharge phase of the electric system once a communication between the first BMS and the second BMS is established.

[Clause 50] The electric system of clause 49, wherein the first BMS is further adapted for performing initial verifications before closing the current-limiting path.

[Clause 51] The electric system of clause 50, wherein the initial verifications comprise a confirmation of the communication between the first BMS and the second BMS.

Modifications and improvements to the above-described implementations of the present technology may become apparent to those skilled in the art. The foregoing description is intended to be exemplary rather than limiting.

What is claimed is:

1. A method for energizing an electric system, comprising:
    applying an energizing trigger to a first battery subassembly;
    in response to the energizing trigger, connecting the first battery subassembly in series to a second battery subassembly via a current-limiting path;
    delivering electric power from the first and second battery subassemblies connected in series via the current-limiting path to energize a system controller; and
    once the system controller is energized, connecting the first battery subassembly in series to the second battery subassembly via a non-current-limiting path.

2. The method of claim 1, wherein the first and second battery subassemblies provide a nominal system voltage when connected in series.

3. The method of claim 2, further comprising:
    converting the nominal system voltage to a control voltage, the nominal system voltage being greater than the control voltage; and
    energizing the system controller with the control voltage.

4. The method of claim 3, wherein the electric system comprises a motor and a motor controller, the method further comprising:
    energizing the motor controller with the control voltage; and
    delivering electric power from the motor controller to the motor at the nominal system voltage.

5. The method of claim 4, wherein the motor is an AC motor, the method further comprising:
    energizing the motor controller with the control voltage;
    converting the nominal system voltage into an AC voltage; and
    delivering electric power from the motor controller to the AC motor at the AC voltage.

6. The method of claim 5, wherein:
    the AC motor is a multi-phase motor; and
    the electric power is delivered to the multi-phase motor at a multi-phase AC voltage.

7. The method of claim 1, wherein:
    the first battery subassembly comprises a first battery module connected in series to a second battery module; and
    the second battery subassembly comprises a third battery module connected in series to a fourth battery module.

8. The method of claim 7, wherein the energizing trigger is applied to the first battery module, the method further comprising successively cascading the energizing trigger from the first battery module to the second, third and fourth battery modules.

9. The method of claim 7, wherein connecting the first battery subassembly to the second battery subassembly is controlled by the first battery module.

10. The method of claim 1, wherein the current-limiting path is in parallel with the non-current-limiting path, the method further comprising closing a service switch in series with the current-limiting and non-current-limiting paths.

11. The method of claim 1, wherein:
    the energizing trigger is a start command;
    the first battery subassembly or the second battery subassembly forwards an indication of the start command to the system controller; and
    the system controller controls an operation of the electric system in response to the indication of the start command.

12. The method of claim 11, wherein the start command is a transient command.

13. The method of claim 1, wherein:
    the energizing trigger is a charging command;
    the first battery subassembly or the second battery subassembly forwards an indication of the charging command to the system controller; and
    the system controller controls charging of the first and second battery subassemblies in response to the indication of the charging command.

14. The method of claim 13, wherein the charging command is a continuous command.

15. The method of claim 1, wherein connecting the first battery subassembly in series to the second battery subassembly via the non-current-limiting path is delayed until a condition is met, the condition being selected from at least one of a minimum time delay having been spent after connecting the first and second battery subassemblies via the current-limiting path, a voltage sensed on a load-side of the electric system having reached a minimum voltage threshold, and a current flowing through the first and second battery subassemblies having fallen below a maximum current threshold.

16. The method of claim 1, further comprising disconnecting the current-limiting path between the first and second battery subassemblies after connecting the first and second battery subassemblies via the non-current-limiting path.

17. The method of claim 16, further comprising opening the non-current-limiting path to shutdown the electric system.

* * * * *